United States Patent
Zhang et al.

(10) Patent No.: US 10,432,755 B2
(45) Date of Patent: Oct. 1, 2019

(54) SDN, SDN CONFIGURATION METHOD, SDN-BASED DATA TRANSMISSION METHOD, AND NETWORK CONTROLLER

(71) Applicant: HUAWEI TECHNOLOGIES CO., LTD., Shenzhen, Guangdong (CN)

(72) Inventors: Jinfang Zhang, Shanghai (CN); Wei Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 58 days.

(21) Appl. No.: 15/635,795

(22) Filed: Jun. 28, 2017

(65) Prior Publication Data
US 2017/0302762 A1 Oct. 19, 2017

Related U.S. Application Data

(63) Continuation of application No. PCT/CN2014/095368, filed on Dec. 29, 2014.

(51) Int. Cl.
*H04L 29/06* (2006.01)
*H04L 12/24* (2006.01)
(Continued)

(52) U.S. Cl.
CPC .......... *H04L 69/04* (2013.01); *H04L 41/0803* (2013.01); *H04L 41/20* (2013.01);
(Continued)

(58) Field of Classification Search
CPC ....... H04L 29/06; H04L 12/24; H04L 12/721; H04L 12/851; H04L 29/08;
(Continued)

(56) References Cited

U.S. PATENT DOCUMENTS

| 2005/0163093 A1 | 7/2005 | Garg et al. |
| 2010/0241759 A1* | 9/2010 | Smith ................. H04L 47/10 709/233 |

(Continued)

FOREIGN PATENT DOCUMENTS

| CN | 1938962 | 3/2007 |
| CN | 101159893 | 4/2008 |

(Continued)

OTHER PUBLICATIONS

Notice of Reasons for Rejection, dated Oct. 1, 2018, in Japanese Application No. 2017552195 (9 pp.).

(Continued)

*Primary Examiner* — Kyaw Z Soe
(74) *Attorney, Agent, or Firm* — Staas & Halsey LLP

(57) ABSTRACT

Embodiments provide an SDN, an SDN configuration method, an SDN-based data transmission method, and a network controller. A data packet combination function and a data packet split function are separately configured on nodes in the SDN. Therefore, when data packets of a first service are received, multiple small data packets of the first service may be combined into one large data packet. In comparison with transmission of the multiple small data packets, transmission efficiency of the SDN can be improved by transmitting the combined data packet.

18 Claims, 7 Drawing Sheets

(51) Int. Cl.
*H04L 12/721* (2013.01)
*H04L 12/851* (2013.01)
*H04L 29/08* (2006.01)
*H04L 12/715* (2013.01)
*H04L 12/811* (2013.01)

(52) U.S. Cl.
CPC .............. *H04L 45/38* (2013.01); *H04L 45/64* (2013.01); *H04L 47/2441* (2013.01); *H04L 69/324* (2013.01); *H04L 47/38* (2013.01)

(58) Field of Classification Search
CPC ..... H04L 41/0803; H04L 41/20; H04L 45/38; H04L 69/04; H04L 69/324; H04L 45/64; H04L 47/2441
See application file for complete search history.

(56) References Cited

U.S. PATENT DOCUMENTS

| | | | |
|---|---|---|---|
| 2012/0128062 | A1 | 5/2012 | Mehta et al. |
| 2012/0271981 | A1 | 10/2012 | Bayer et al. |
| 2014/0064146 | A1 | 3/2014 | Wang et al. |
| 2014/0169158 | A1* | 6/2014 | Mishra ............... H04L 69/04 370/228 |
| 2016/0014237 | A1 | 1/2016 | Kamahora et al. |

FOREIGN PATENT DOCUMENTS

| | | |
|---|---|---|
| CN | 101395848 A | 3/2009 |
| CN | 101897156 | 11/2010 |
| CN | 102461195 | 5/2012 |
| CN | 102884836 A | 1/2013 |
| CN | 103326884 A | 9/2013 |
| CN | 103634076 | 3/2014 |
| JP | 2003304284 A | 10/2003 |
| JP | 2010-245818 A | 10/2010 |
| WO | 2014002481 A1 | 1/2014 |
| WO | 2014155617 A1 | 10/2014 |

OTHER PUBLICATIONS

International Search Report dated Sep. 18, 2015 in corresponding International Application No. PCT/CN2014/095368.
International Search Report, dated Sep. 18, 2015, in International Application No. PCT/CN2014/095368 (4 pp.).
OpenFlow Switch Specification, Version 1.4.0, 2013 The Open Networking Foundation, pp. 1-205.
De Poorter E et al: "Non-intrusive aggregation in wireless sensor networks," Ad Hoc Networks, Elsevier, Amsterdam, NL, vol. 9, No. 3, May 1, 2011, pp. 324-340, XP027596326.
Extended European Search Report dated Dec. 7, 2017 in corresponding European Patent Application No. 14909324.7.
Japanese Office Action dated Apr. 8, 2019 in corresponding Japanese Patent Application No. 2017-552195 (5 pages).
Office Action, dated Jun. 4, 2019, in Chinese Application No. 201480083937.8 (8 pp.).

* cited by examiner

US 10,432,755 B2

SDN, SDN CONFIGURATION METHOD, SDN-BASED DATA TRANSMISSION METHOD, AND NETWORK CONTROLLER

CROSS-REFERENCE TO RELATED APPLICATIONS

This application is a continuation of International Application No. PCT/CN2014/095368, filed on Dec. 29, 2014, the disclosure of which is hereby incorporated by reference in its entirety.

TECHNICAL FIELD

This application relates to the communications field, and in particular, to an SDN network-based data transmission method, an SDN configuration method, an SDN network, and a network controller.

BACKGROUND

Because of meeting intelligent transfer of information between a large quantity of machines, machine-to-machine (machine to machine, M2M) communication develops significantly. Machine type communication (Machine Type Communication, MTC)-oriented new services are mainstream future services. An MTC service is mainly characterized by small data packets. However, because a large quantity of small data packets are transmitted in a network, network forwarding efficiency is reduced.

SUMMARY

This application provides an SDN network-based data transmission method, an SDN configuration method, an SDN network, and a network controller, so as to resolve a problem that network forwarding efficiency is reduced because a large quantity of small data packets are transmitted in a network.

To achieve the foregoing objective, this application provides the following technical solutions.

A first aspect of this application provides a network controller, including:

a first transmitter, configured to: when receiving a first type of data stream of a first service, send combination configuration information to a first ingress node, where the combination configuration information is used to instruct the first ingress node to combine received data packets of the first service, and the first type of data stream is a data stream subsequent to a first data stream of the first service;

a second transmitter, configured to instruct a software-defined networking SDN controller to perform flow entry configuration on a router or a switch, or a router and a switch in the software-defined network by using the configuration information; and a third transmitter, configured to: when a destination node of a data packet of the first service belongs to the software-defined network, send data packet splitting configuration information to the destination node; or when a destination node of a data packet of the first service does not belong to the software-defined network, send data packet splitting configuration information to a distribution node of the first service in the software-defined network, where the data packet splitting configuration information is used to instruct the destination node or the distribution node to split a combined data packet into data packets before being combined.

In a first implementation manner of the first aspect of this application, that the first transmitter is configured to send the combination configuration information to the first ingress node includes the first transmitter is specifically configured to send the combination configuration information to the first ingress node, where the combination configuration information includes a combination header, and the combination header is generated according to headers of the data packets of the first service.

In a second implementation manner of the first aspect of this application, that the first transmitter is specifically configured to send the combination configuration information to the first ingress node, where the combination configuration information includes the combination header, includes the first transmitter is specifically configured to send the combination configuration information to the first ingress node, where the combination configuration information includes the combination header, and when received data streams of the first service have a same destination node, the combination header is a header of a data packet that is input from the first data stream of the first service.

In a third implementation manner of the first aspect of this application, that the first transmitter is specifically configured to send the combination configuration information to the first ingress node, where the combination configuration information includes the combination header, includes the first transmitter is specifically configured to send the combination configuration information to the first ingress node, where the combination configuration information includes the combination header, and when received data streams of the first service have different destination nodes but a same distribution node, the combination header is a virtual header, and the virtual header includes an address of the distribution node.

In a fourth implementation manner of the first aspect of this application, the network controller further includes:

a fourth transmitter, configured to: when the data packet of the first service is a header-compressed data packet, if the destination node of the data packet that is in the first type of data stream and that is of the first service belongs to the software-defined network, send decompression configuration information to the destination node; or if the destination node of the data packet of the first service does not belong to the software-defined network, send decompression configuration information to the distribution node, where the decompression configuration information is used to instruct the destination node or the distribution node to decompress the split data packets.

In a fifth implementation manner of the first aspect of this application, the network controller further includes:

a fifth transmitter, configured to: when receiving the first type of data stream of the first service, send header compression configuration information to the first ingress node, where the header compression configuration information is used to instruct the first ingress node to perform header compression on the received data packets of the first service.

In a sixth implementation manner of the first aspect of this application, when an ingress node of the data packet of the first service belongs to an access network of the software-defined network, and the destination node of the data packet of the first service belongs to a non-software-defined network, the distribution node of the first service is an access network gateway that is in the software-defined network and that connects the software-defined network and the non-software-defined network.

In a seventh implementation manner of the first aspect of this application, when an ingress node of the data packet of the first service belongs to a non-software-defined network, and the destination node of the data packet of the first service belongs to an access network of the software-defined network, an ingress node of the first service is an access network gateway that is in the software-defined network and that connects the non-software-defined network and the software-defined network.

In an eighth implementation manner of the first aspect of this application, when an ingress node of the data packet of the first service belongs to a non-software-defined network, and the destination node of the data packet of the first service belongs to an access network of the software-defined network, an ingress node of the first service is an access network gateway that is in the software-defined network and that connects the non-software-defined network and the software-defined network.

In a ninth implementation manner of the first aspect of this application, the first transmitter is further configured to:

when the ingress node of the first service is switched from the first ingress node to a second ingress node, send the combination configuration information to the second ingress node, where the second ingress node is an ingress node in the SDN network.

In a tenth implementation manner of the first aspect of this application, when the software-defined network is a core network, and both access networks on two sides of the software-defined network are non-software-defined networks, the first ingress node is a first edge gateway, where the first edge gateway is an edge gateway that is in the software-defined network and that connects the software-defined network and a first non-software-defined network, the distribution node of the first service in the software-defined network is a second edge gateway, the second edge gateway is an edge gateway that is in the software-defined network and that connects the software-defined network and a second non-software-defined network, the first non-software-defined network is a network in which a source node of the data stream of the first service is located, and the second non-software-defined network is a network in which the destination node of the data stream of the first service is located.

In an eleventh implementation manner of the first aspect of this application, the network controller further includes:

a controller, configured to: when an ingress node of the first service is switched from the first ingress node to a second ingress node, control the first ingress node to forward the combination configuration information to the second ingress node.

A second aspect of embodiments of this application provides a software-defined network, including:

a first ingress node, configured to: when receiving a first type of data stream of a first service, combine received data packets of the first service according to preset configuration information, where the first ingress node is an ingress node of the first service in the software-defined network, and the first type of data stream is a data stream subsequent to a first data stream of the first service;

a transmission module, configured to transmit a combined data packet; and a splitting module, configured to split the combined data packet into data packets before being combined, where when a destination node of a data packet of the first service belongs to the software-defined network, the splitting module is the destination node; or when a destination node of a data packet of the first service does not belong to the software-defined network, the splitting module is a distribution node of the first service in the software-defined network.

In a first implementation manner of the second aspect of the embodiments of this application, that the first ingress node is configured to combine the received data packets of the first service includes the first ingress node is specifically configured to combine the received data packets of the first service, where the combined data packet includes a combination header, a quantity of data packets that are combined, and lengths of the data packets that are combined, and the combination header is generated according to headers of the data packets of the first service.

In a second implementation manner of the second aspect of the embodiments of this application, that the first ingress node is configured to combine the received data packets of the first service, where the combined data packet includes the combination header, includes the first ingress node is specifically configured to combine the received data packets of the first service, and when received data streams of the first service have a same destination node, the combination header is a header of the first data stream of the first service.

In a third implementation manner of the second aspect of the embodiments of this application, that the first ingress node is configured to combine the received data packets of the first service, where the combined data packet includes the combination header, includes the first ingress node is specifically configured to combine the received data packets of the first service, and when received data streams of the first service have different destination nodes but a same distribution node in the software-defined network, the combination header is a virtual header, where the virtual header is an address of the distribution node of the first service in the software-defined network.

In a fourth implementation manner of the second aspect of the embodiments of this application, the transmission module includes:

a router or a switch in the software-defined network, configured to transmit the combined data packet, where a controller in the software-defined network performs in advance flow entry configuration on the router or the switch in the software-defined network by using the combination header.

In a fifth implementation manner of the second aspect of the embodiments of this application, the software-defined network further includes:

a decompression module, configured to decompress the split data packets, where when the destination node of the data packet of the first service belongs to the software-defined network, the decompression module is the destination node; or when the destination node of the data packet of the first service does not belong to the software-defined network, the decompression module is the distribution node.

In a sixth implementation manner of the second aspect of the embodiments of this application, the first ingress node is further configured to:

when a received data stream of the first service is the first data stream of the first service, decompress a header-compressed data packet, so as to obtain a header of the data stream of the first service.

In a seventh implementation manner of the second aspect of the embodiments of this application, the first ingress node is further configured to:

when receiving the first type of data stream of the first service, perform header compression on the data packet of the first service according to the preset configuration information.

In an eighth implementation manner of the second aspect of the embodiments of this application, the software-defined network further includes:

a second ingress node, configured to: when the ingress node of the first service is switched from the first ingress node to the second ingress node, combine the received data packets of the first service according to the combination configuration information; where the first ingress node is further configured to:

when the ingress node of the first service is switched from the first ingress node to the second ingress node, send the combination configuration information to the second ingress node.

A third aspect of the embodiments of this application provides a software-defined network configuration method, including:

when receiving a first type of data stream of a first service, sending, by a network controller, combination configuration information to a first ingress node, where the combination configuration information is used to instruct the first ingress node to combine received data packets of the first service, and the first type of data stream is a data stream subsequent to a first data stream of the first service;

instructing, by the network controller, a software-defined networking SDN controller to perform flow entry configuration on a router or a switch, or a router and a switch in the software-defined network by using the configuration information; and when a destination node of a data packet of the first service belongs to the software-defined network, sending, by the network controller, data packet splitting configuration information to the destination node; or when a destination node of a data packet of the first service does not belong to the software-defined network, sending, by the network controller, data packet splitting configuration information to a distribution node of the first service in the software-defined network, where the data packet splitting configuration information is used to instruct the destination node or the distribution node to split a combined data packet into data packets before being combined.

In a first implementation manner of the third aspect of the embodiments of this application, the combination configuration information includes a combination header, and the combination header is generated according to headers of the data packets of the first service.

In a second implementation manner of the third aspect of the embodiments of this application, that the combination header is generated according to the headers of the data packets of the first service includes:

when received data streams of the first service have a same destination node, the combination header is a header of a data packet that is input from the first data stream of the first service.

In a third implementation manner of the third aspect of the embodiments of this application, that the combination header is generated according to the headers of the data packets of the first service includes:

when received data streams of the first service have different destination nodes but a same distribution node, the combination header is a virtual header, where the virtual header includes an address of the distribution node.

In a fourth implementation manner of the third aspect of the embodiments of this application, the data packet of the first service is a header-compressed data packet, and the method further includes:

when the destination node of the data packet of the first service belongs to the software-defined network, sending, by the network controller, decompression configuration information to the destination node; or when the destination node of the data packet of the first service does not belong to the software-defined network, sending, by the network controller, decompression configuration information to the distribution node, where the decompression configuration information is used to instruct the destination node or the distribution node to decompress the split data packets.

In a fifth implementation manner of the third aspect of the embodiments of this application, the method further includes:

when a received data stream of the first service is not the first data stream of the first service, sending, by the network controller, header compression configuration information to the first ingress node, where the header compression configuration information is used to instruct the first ingress node to perform header compression on the received data packets of the first service.

In a sixth implementation manner of the third aspect of the embodiments of this application, when an ingress node of the data packet of the first service belongs to an access network of the software-defined network, and the destination node of the data packet of the first service belongs to a non-software-defined network, the distribution node of the first service is an access network gateway that is in the software-defined network and that connects the software-defined network and the non-software-defined network.

In a seventh implementation manner of the third aspect of the embodiments of this application, when an ingress node of the data packet of the first service belongs to a non-software-defined network, and the destination node of the data packet of the first service belongs to an access network of the software-defined network, the ingress node of the first service is an access network gateway that is in the software-defined network and that connects the non-software-defined network and the software-defined network.

In an eighth implementation manner of the third aspect of the embodiments of this application, the method further includes:

when the ingress node of the first service is switched from the first ingress node to a second ingress node, sending, by the network controller, the combination configuration information to the second ingress node, where the second ingress node is an ingress node in the SDN network.

In a ninth implementation manner of the third aspect of the embodiments of this application, when the software-defined network is a core network, and both access networks on two sides of the software-defined network are non-software-defined networks, the first ingress node is a first edge gateway, where the first edge gateway is an edge gateway that is in the software-defined network and that connects the software-defined network and a first non-software-defined network, the distribution node of the first service in the software-defined network is a second edge gateway, the second edge gateway is an edge gateway that is in the software-defined network and that connects the software-defined network and a second non-software-defined network, the first non-software-defined network is a network in which a source node of the data stream of the first service is located, and the second non-software-defined network is a network in which the destination node of the data stream of the first service is located.

In a tenth implementation manner of the third aspect of the embodiments of this application, the method further includes:

when the ingress node of the first service is switched from the first ingress node to a second ingress node, controlling, by the network controller, the first ingress node to forward the combination configuration information to the second ingress node.

A fourth aspect of this application provides a software-defined network-based data transmission method, including:

when receiving a first type of data stream of a first service, concatenating, by a first ingress node in the software-defined network, received data packets of the first service according to preset configuration information, where the first ingress node is an ingress node of the first service in the software-defined network, and the first type of data stream is a data stream subsequent to a first data stream of the first service;

transmitting, by the software-defined network, a combined data packet; and when a destination node of a data packet of the first service belongs to the software-defined network, splitting, by the destination node, the combined data packet into data packets before being combined; or when a destination node of a data packet of the first service does not belong to the software-defined network, splitting, by a distribution node of the first service in the software-defined network, the combined data packet into data packets before being combined.

In a first implementation manner of the fourth aspect of this application, the combined data packet includes a combination header, a quantity of data packets that are combined, and lengths of the data packets that are combined, and the combination header is generated according to headers of the data packets of the first service.

In a second implementation manner of the fourth aspect of this application, when received data streams of the first service have a same destination node, the combination header is a header of the first data stream of the first service.

In a third implementation manner of the fourth aspect of this application, when received data streams of the first service have different destination nodes but a same distribution node in the software-defined network, the combination header is a virtual header, and the virtual header is an address of the distribution node of the first service in the software-defined network.

In a fourth implementation manner of the fourth aspect of this application, the transmitting, by the software-defined network, a combined data packet includes:

transmitting, by a router or a switch in the software-defined network, the combined data packet, where a controller in the software-defined network performs in advance flow entry configuration on the router or the switch in the software-defined network by using the combination header.

In a fifth implementation manner of the fourth aspect of the embodiments of this application, the data packet of the first service is a header-compressed data packet, and the method further includes:

when the destination node of the data packet of the first service belongs to the software-defined network, decompressing, by the destination node, the split data packets; or when the destination node of the data packet of the first service does not belong to the software-defined network, decompressing, by the distribution node, the split data packets.

In a sixth implementation manner of the fourth aspect of this application, the method further includes:

when a received data stream of the first service is the first data stream of the first service, decompressing, by the first ingress node, a header-compressed data packet, so as to obtain a header of the data stream of the first service.

In a seventh implementation manner of the fourth aspect of this application, the method further includes:

when a received data stream of the first service is not the first data stream of the first service, performing, by the first ingress node, header compression on the data packet of the first service according to the preset configuration information.

In an eighth implementation manner of the fourth aspect of this application, the method further includes:

when the ingress node of the first service is switched from the first ingress node to a second ingress node, sending, by the first access point, the combination configuration information to the second access point; and concatenating, by the second ingress node, the received data packets of the first service according to the combination configuration information, where the second ingress node is an ingress node in the software-defined network.

According to the SDN, the SDN configuration method, the SDN-based data transmission method, and the network controller provided in the embodiments, a data packet combination function and a data packet split function are separately configured on nodes in the SDN. Therefore, when data packets of a first service are received, multiple small data packets of the first service may be combined into one large data packet. In comparison with transmission of the multiple small data packets, transmission efficiency of the SDN can be improved by transmitting the combined data packet.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

This application discloses a network controller and a software-defined network configuration method, which are applied to a software-defined network (Software Defined Network, SDN). During implementation of MTC by using the SDN, there are small data packets being transmitted in the SDN, and consequently, transmission efficiency of the SDN network is easily reduced. The network controller and the software-defined network configuration method disclosed in embodiments of this application are intended to configure a data packet combination node, a data packet split node, and a data packet decompression node in the SDN, so as to implement combination and transmission of compressed data packets. That is, multiple small data packets are combined into a large data packet for transmission, and then the large data packet is split and decompressed on a data packet distribution node or a data packet destination node, so as to improve the transmission efficiency of the SDN.

The following clearly describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

Figure 1:
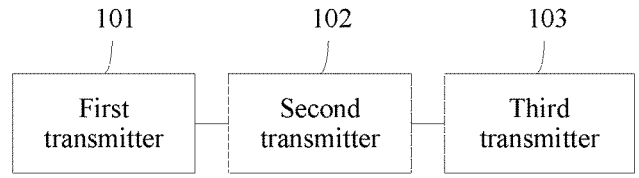
FIG. 1 is a schematic structural diagram of a network controller according to an embodiment of the present invention.

As shown in FIG. 1, an embodiment of this application discloses a network controller, including a first transmitter 101, a second transmitter 102, and a third transmitter 103.

The first transmitter 101 is configured to: when receiving a first type of data stream of a first service, send combination configuration information to a first ingress node.

The combination configuration information is used to instruct the first ingress node to combine received data packets of the first service.

The first type of data stream is a data stream subsequent to a first data stream of the first service, that is, is not the first data stream of the first service.

In this embodiment, the first ingress node is an ingress node of the first service in the software-defined network. It should be noted that, in this embodiment, an ingress node is specific to a service stream transmission path, and an ingress node of a data stream may be a distribution node of another data stream, that is, the first ingress node is specific to the first service, and different services may have a same ingress node or different ingress nodes. If different services have a same ingress node, the ingress node is an aggregation node of service streams.

The second transmitter 102 is configured to instruct a software-defined networking SDN controller to perform flow entry configuration on a router or a switch, or a router and a switch in the software-defined network by using the configuration information. This is intended to enable the router or the switch in the SDN to correctly identify a combination header, so as to correctly forward a combined data packet.

The third transmitter 103 is configured to: when a destination node of a data packet of the first service belongs to the software-defined network, send data packet splitting configuration information to the destination node; or when a destination node of a data packet of the first service does not belong to the software-defined network, send data packet splitting configuration information to a distribution node of the first service in the software-defined network.

The data packet splitting configuration information is used to instruct the destination node or the distribution node to split a combined data packet into data packets before being combined.

According to the network controller in this embodiment, a data packet combination function and a data packet split function are separately configured on nodes in an SDN. Therefore, when data packets of a first service are received, multiple small data packets of the first service may be combined into one large data packet. In comparison with transmission of the multiple small data packets, transmission efficiency of the SDN can be improved by transmitting the combined data packet.

Figure 2:
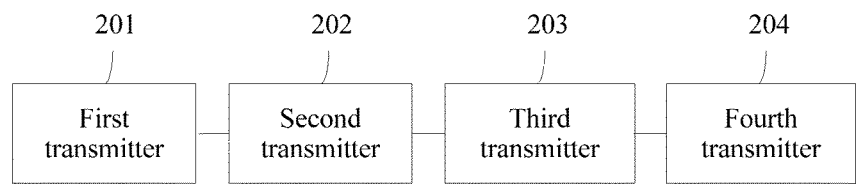
FIG. 2 is a schematic structural diagram of another network controller according to an embodiment of the present invention.

As shown in FIG. 2, an embodiment of this application discloses another network controller, including a first transmitter 201, a second transmitter 202, a third transmitter 203, and a fourth transmitter 204.

The first transmitter 201 is configured to: when a received data stream of a first service is not a first data stream of the first service, send combination configuration information to a first ingress node.

In this embodiment, the combination configuration information includes a combination header, and the combination header is generated according to headers of data packets of the first service. Generally, a header of a data packet indicates an address of the data packet. Therefore, the combination header generated according to the headers of the data packets of the first service also has a function of indicating an address. The combination configuration information is used to instruct the first ingress node to combine received data packets of the first service into a data packet with a combination header.

Figure 3:
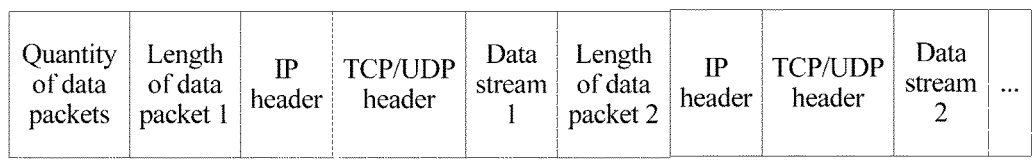
FIG. 3 is a schematic diagram of a combination header according to an embodiment of the present invention.

Further, as shown in FIG. 3, when received data streams of the first service have a same destination node, the combination header is a header of a data packet that is input from the first data stream of the first service. For example, when multiple IP data packets are combined, a combination header is an IP header and a TCP/UDP header of the data packet that is input from the first data stream.

Figure 4:
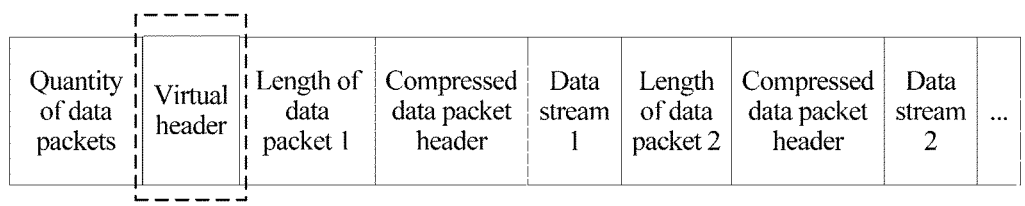
FIG. 4 is a schematic diagram of another combination header according to an embodiment of the present invention.

As shown in FIG. 4, when received data streams of the first service have different destination nodes but a same distribution node, the combination header is a virtual header, and the virtual header includes an address of the distribution node.

In addition, the first transmitter 201 may be further configured to: when an ingress node of the first service is switched from the first ingress node to a second ingress node in an SDN network, send the combination configuration information to the second ingress node.

In this embodiment, the data packet of the first service is a header-compressed data packet that is sent by a source node of the first service. Specifically, the header-compressed data packet may be a data packet undergoing robust header compression (robust header compression, ROHC).

Currently, ROHC is usually applied to a wireless network, and is used to implement execution of functions of header compression and decompression on an IP data stream. A compressed header type includes RTP/UDP/IP, TCP/IP, UDP/IP, IP, and the like. An ROHC-compressed data packet does not have a complete IP header, and therefore does not have an IP routing capability.

Because the data packet of the first service is an ROHC-compressed data packet, the network controller in this embodiment needs to set the fourth transmitter 204, configured to: when the data packet of the first service is a header-compressed data packet, if the destination node of the data packet that is in the first type of data stream and that is of the first service belongs to the software-defined network, send decompression configuration information to the destination node; or if the destination node of the data packet of the first service does not belong to the software-defined network, send decompression configuration information to the distribution node.

The decompression configuration information is used to instruct the destination node or the distribution node to decompress the split data packets. It should be noted that the decompression configuration information is corresponding to a specific compression manner of a compressed data packet received by the SDN. For example, when the SDN receives an ROHC data packet, the decompression configuration information is robust header decompression configuration information.

Functions of the second transmitter 202 and the third transmitter 203 in this embodiment are the same as those in the foregoing embodiment, and details are not described herein.

As described in the foregoing, in the prior art, data packet header compression such as ROHC is applied to a last-hop wireless network. However, for a network that needs to use an IP address for route transmission, such as an SDN or an IP wired network, a data packet header compression technology cannot be used. According to the method in this embodiment, small data packets are combined, and a combination header is generated according to headers of the small data packets, and has a function of indicating an address. Therefore, a combined data packet can still be transmitted by the SDN. Therefore, by using the method in this embodiment, a utilization scope of a header-compressed data packet is extended.

In addition, in this embodiment, when the ingress node of the first service is switched, the network controller performs combination configuration on a switched-to ingress node, so that when the ingress node is switched, the SDN can still ensure relatively high transmission efficiency.

Figure 5:
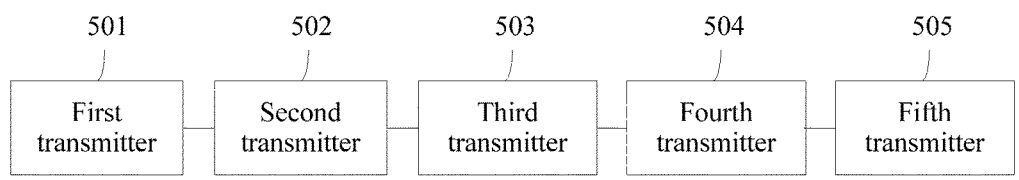
FIG. 5 is a schematic structural diagram of still another network controller according to an embodiment of the present invention.

As shown in FIG. 5, an embodiment of this application discloses another network controller, including a first transmitter 501, a second transmitter 502, a third transmitter 503, a fourth transmitter 504, and a fifth transmitter 505.

The fifth transmitter 505 is configured to: when receiving the first type of data stream of a first service, send header compression configuration information to the first ingress node, where the header compression configuration information is used to instruct the first ingress node to perform header compression on received data packets of the first service.

Functions of other modules in this embodiment are similar to those in the foregoing embodiments, and details are not described herein.

Compared with the foregoing embodiment, in this embodiment, the network controller sends the header compression configuration information to the first ingress node instead of a source node of the first service, so that an SDN has a header compression function.

Generally, an SDN may be used as an access network, or may be used as a core network, and may be used as a full coverage network, or may be used as a partial coverage network. Therefore, under different functions of the SDN, the "ingress node", the "destination node", and the "distribution node" in the foregoing embodiments are respectively corresponding to the following cases.

1. When the ingress node of the data packet of the first service belongs to an SDN access network, and the destination node of the data packet of the first service belongs to a non-SDN, the distribution node of the first service is an access network gateway that is in the SDN and that connects the SDN and the non-SDN.

2. When the ingress node of the data packet of the first service belongs to a non-SDN network, and the destination node of the data packet of the first service belongs to an SDN access network, the ingress node of the first service is an access network gateway that is in the SDN and that connects the non-SDN and the SDN.

3. When all networks are SDNs, an "ingress node" is the ingress node of the first service in the SDN, and a "destination node" is the destination node of the data packet of the first service in the SDN network (as described in the foregoing embodiments).

In addition to the foregoing cases, an embodiment of this application discloses another network controller. In this embodiment, an SDN is a core network, access networks on two sides of the SDN are non-SDN networks, and a destination node of a data packet of a first service belongs to the non-SDN network. The access networks on the two sides of the SDN are two access networks directly connected to the SDN.

Figure 6:
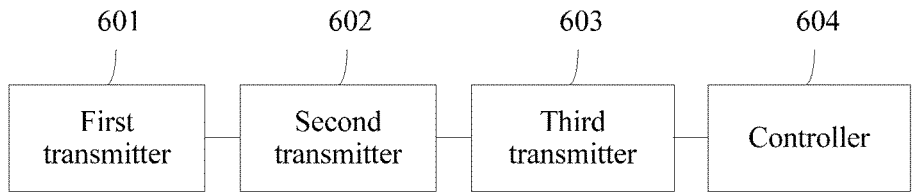
FIG. 6 is a schematic structural diagram of yet another network controller according to an embodiment of the present invention.

As shown in FIG. 6, the network controller includes a first transmitter 601, a second transmitter 602, a third transmitter 603, and a controller 604.

The first transmitter 601 is configured to: when receiving a first type of data stream of the first service, send combination configuration information to a first ingress node.

In this embodiment, the first ingress node is a first edge gateway, where the first edge gateway is an edge gateway that is in the SDN and that connects the SDN and a first non-SDN, the first non-SDN network is a network in which a source node of a data stream of the first service is located, and a second non-SDN network is a network in which a destination node of the data stream of the first service is located.

The third transmitter 603 is configured to send data packet splitting configuration information to a distribution node of the first service.

The distribution node of the first service in the SDN is a second edge gateway, where the second edge gateway is an edge gateway that is in the SDN and that connects the SDN and the second non-SDN network.

The controller 604 is configured to: when an ingress node of the first service is switched from the first ingress node to a second ingress node, control the first ingress node to forward the combination configuration information to the second ingress node.

According to the network controller in this embodiment, when the SDN is a core network, and both the access networks on the two sides of the SDN are non-SDN networks, transmission efficiency of the SDN can be improved.

Figure 7:
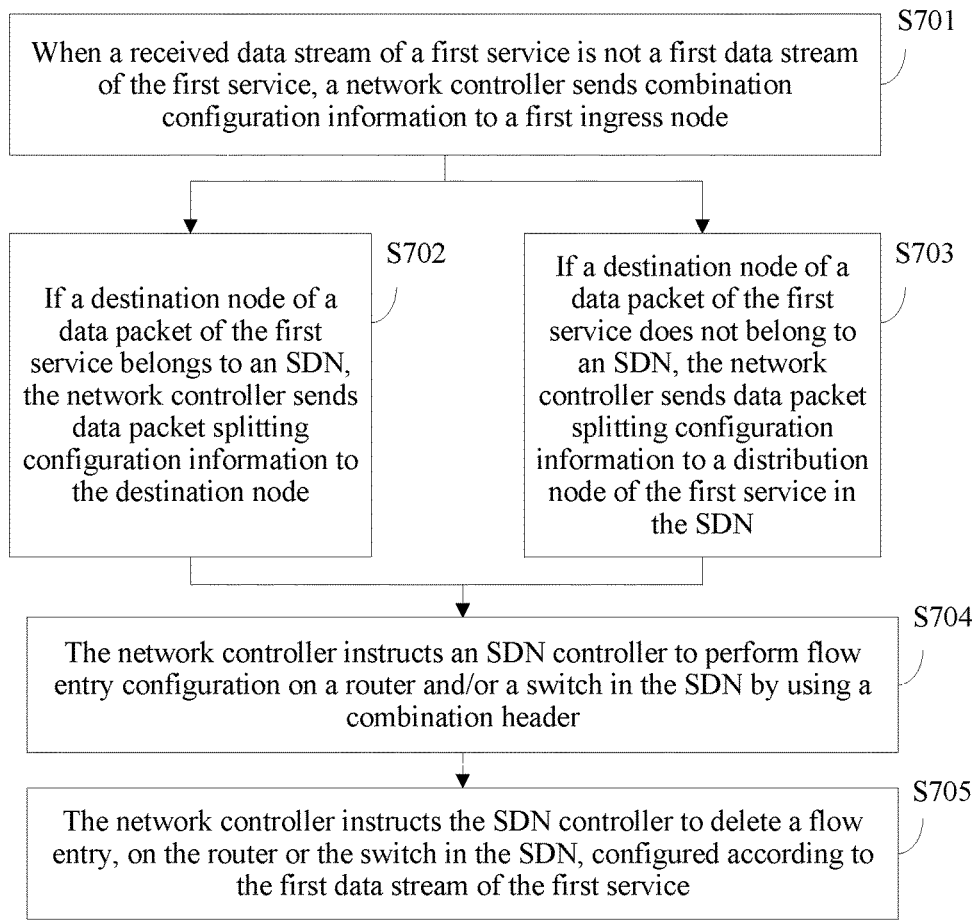
FIG. 7 is a flowchart of an SDN configuration method according to an embodiment of the present invention.

As shown in FIG. 7, an embodiment of this application discloses an SDN configuration method, including the following specific steps.

S701. When a received data stream of a first service is not a first data stream of the first service, a network controller sends combination configuration information to a first ingress node.

The combination configuration information includes a combination header, and the combination header is generated according to headers of data packets of the first service. Generally, a header of a data packet indicates an address of the data packet. Therefore, the combination header generated according to the headers of the data packets of the first service also has a function of indicating an address. The combination configuration information is used to instruct the first ingress node to combine received data packets of the first service into a data packet with a combination header.

Further, as shown in the figure, when received data streams of the first service have a same destination node, the combination header is a header of a data packet that is input from the first data stream of the first service. For example, when multiple IP data packets are combined, a combination header is an IP header and a TCP/UDP header of the data packet that is input from the first data stream.

As shown in the figure, when received data streams of the first service have different destination nodes but a same distribution node, the combination header is a virtual header, and the virtual header includes an address of the distribution node.

In this embodiment, the first ingress node is an ingress node of the first service in the software-defined network. It should be noted that, in this embodiment, an ingress node is specific to a service stream transmission path, and an ingress node of a data stream may be a distribution node of another data stream, that is, the first ingress node is specific to the first service, and different services may have a same ingress node or different ingress nodes. If different services have a same ingress node, the ingress node is an aggregation node of service streams.

S702. If a destination node of a data packet of the first service belongs to the SDN, the network controller sends data packet splitting configuration information to the destination node.

S703. If a destination node of a data packet of the first service does not belong to the SDN, the network controller sends data packet splitting configuration information to a distribution node of the first service in the SDN.

The data packet splitting configuration information is used to instruct the destination node or the distribution node to split a combined data packet into data packets before being combined.

S704. The network controller instructs an SDN controller to perform flow entry configuration on a router or a switch, or a router and a switch in the SDN by using a combination header. This is intended to enable the router or the switch in the SDN to correctly identify a combination header, so as to correctly forward a combined data packet.

When the combination header is a virtual header, the method in this embodiment may further include:

S705. The network controller instructs the SDN controller to delete a flow entry, on the router or the switch in the SDN, configured according to the first data stream of the first service.

Because the virtual header includes the address of the distribution node, the address of the distribution node is indicated. Therefore, a purpose of this step is to ensure that the router or the switch correctly forwards the combined data packet.

It can be learned from the foregoing steps that, according to the method in this embodiment, a network controller separately configures a data packet combination function and a data packet split function on nodes in an SDN. Therefore, when data packets of a first service are received, multiple small data packets of the first service may be combined into one large data packet. In comparison with transmission of the multiple small data packets, transmission efficiency of the SDN can be improved by transmitting the combined data packet.

Figure 8:
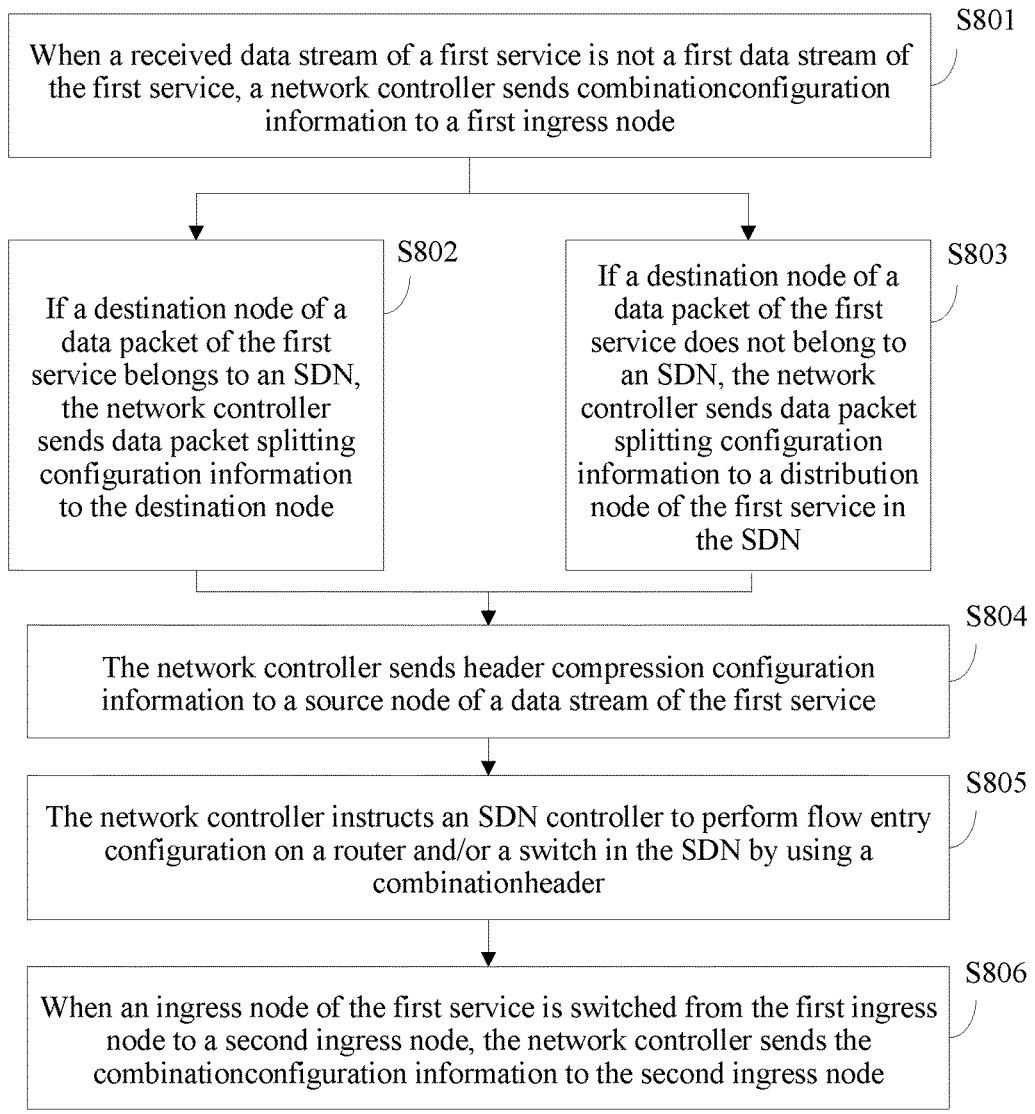
FIG. 8 is a flowchart of another SDN configuration method according to an embodiment of the present invention.

As shown in FIG. 8, an embodiment of this application discloses another SDN configuration method, including the following specific steps.

S801. When a received data stream of a first service is not a first data stream of the first service, a network controller sends combination configuration information to a first ingress node.

In this embodiment, the data packet of the first service is a header-compressed data packet that is sent by a source node of the first service. Specifically, the header-compressed data packet may be a data packet undergoing robust header compression (robust header compression, ROHC).

Currently, ROHC is usually applied to a wireless network, and is used to implement execution of functions of header compression and decompression on an IP data stream. A compressed header type includes RTP/UDP/IP, TCP/IP, UDP/IP, IP, and the like. An ROHC-compressed data packet does not have a complete IP header, and therefore does not have an IP routing capability.

S802. When a destination node of a data packet of the first service belongs to the SDN, the network controller sends data packet splitting configuration information and decompression configuration information to the destination node.

S803. When a destination node of a data packet of the first service does not belong to the SDN, the network controller sends data packet splitting configuration information and decompression configuration information to a distribution node of the first service in the SDN.

The decompression configuration information is used to instruct the destination node or the distribution node to decompress the split data packets. It should be noted that the decompression configuration information is corresponding to a specific compression manner of a compressed data packet received by the SDN. For example, when the SDN receives an ROHC data packet, the decompression configuration information is robust header decompression configuration information.

S804. The network controller sends header compression configuration information to a source node of a data stream of the first service, where the header compression configuration information is used to instruct the source node to perform header compression on the data stream of the first service.

S805. The network controller instructs an SDN controller to perform flow entry configuration on a router and/or a switch in the SDN by using a combination header.

S806. When an ingress node of the first service is switched from the first ingress node to a second ingress node, the network controller sends the combination configuration information to the second ingress node, where the second ingress node is an ingress node in the SDN network.

As described in the foregoing, in the prior art, data packet header compression such as ROHC is applied to a last-hop wireless network. However, for a network that needs to use an IP address for route transmission, such as an SDN or an IP wired network, a data packet header compression technology cannot be used. According to the method in this embodiment, small data packets are combined, and a combination header is generated according to headers of the small data packets, and has a function of indicating an address. Therefore, a combined data packet can still be transmitted by the SDN. Therefore, by using the method in this embodiment, a utilization scope of a header-compressed data packet is extended.

In addition, in this embodiment, when the ingress node of the first service is switched, the network controller performs combination configuration on a switched-to ingress node, so that when the ingress node is switched, the SDN can still ensure relatively high transmission efficiency.

Figure 9:
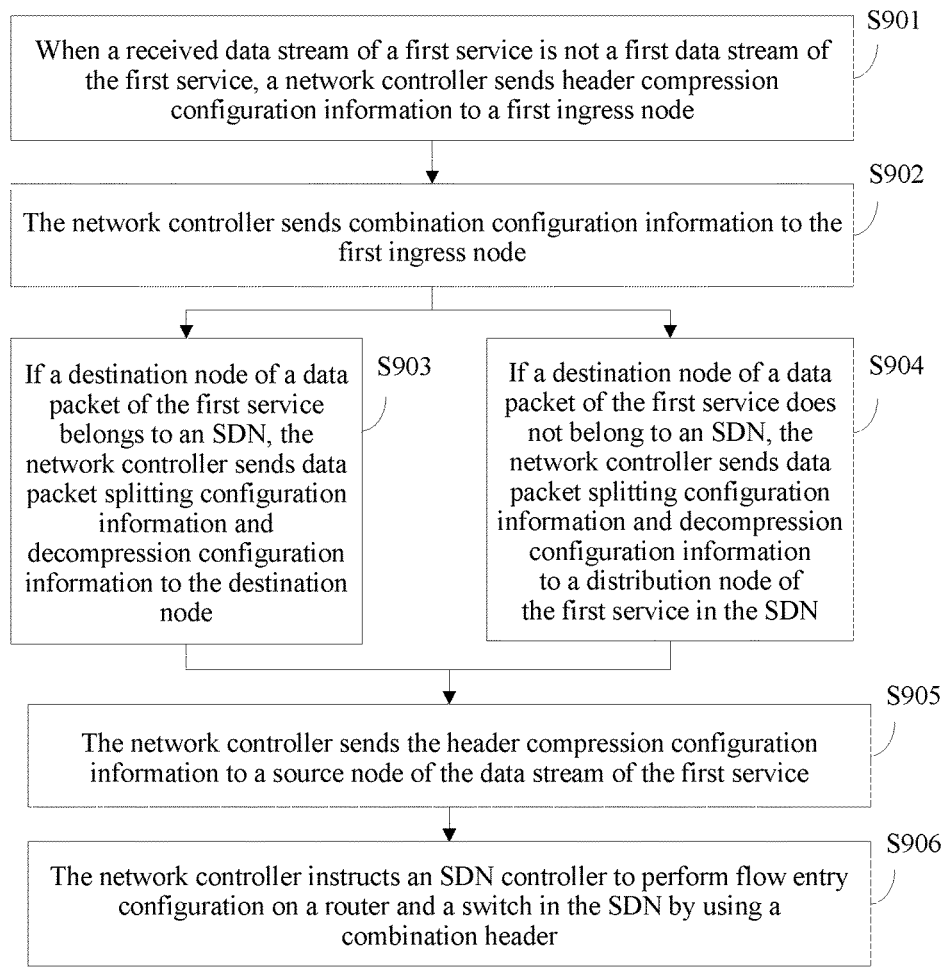
FIG. 9 is a flowchart of still another SDN configuration method according to an embodiment of the present invention.

As shown in FIG. 9, an embodiment of this application discloses another SDN configuration method, including the following steps.

S901. When a received data stream of a first service is not a first data stream of the first service, a network controller sends header compression configuration information to a first ingress node, where the header compression configuration information is used to instruct the first ingress node to perform header compression on received data packets of the first service.

S902. When the received data stream of the first service is not the first data stream of the first service, the network controller sends combination configuration information to the first ingress node.

S903. When a destination node of a data packet of the first service belongs to the SDN, the network controller sends data packet splitting configuration information and decompression configuration information to the destination node.

S904. When a destination node of a data packet of the first service does not belong to the SDN, the network controller sends data packet splitting configuration information and decompression configuration information to a distribution node of the first service in the SDN.

S905. The network controller instructs an SDN controller to perform flow entry configuration on a router and a switch in the SDN by using a combination header.

Compared with the foregoing embodiment, in this embodiment, the network controller sends the header compression configuration information to the first ingress node instead of a source node of the first service, so that an SDN has a header compression function.

In addition to the foregoing cases, the following case may also exist: The SDN is a core network, both access networks on two sides of the SDN are non-SDN networks, and the destination node of the data packet of the first service belongs to the non-SDN network. In this case, an embodiment of this application discloses an SDN configuration method, specifically including the following steps.

A: When a received data stream of a first service is not a first data stream of the first service, a network controller sends combination configuration information to a first ingress node.

In this embodiment, the first ingress node is a first edge gateway, where the first edge gateway is an edge gateway that is in the SDN and that connects the SDN and a first non-SDN, the first non-SDN network is a network in which a source node of a data stream of the first service is located, and a second non-SDN network is a network in which a destination node of the data stream of the first service is located.

B: The network controller sends data packet splitting configuration information and decompression configuration information to a distribution node of the first service in the SDN.

The distribution node of the first service in the SDN is a second edge gateway, where the second edge gateway is an edge gateway that is in the SDN and that connects the SDN and the second non-SDN network.

C: The network controller sends header compression configuration information to the first edge gateway, where the header compression configuration information is used to instruct the first edge gateway to perform header compression on the data stream of the first service.

D: The network controller instructs an SDN controller to perform flow entry configuration on a router or a switch in the SDN by using a combination header.

E: When an ingress node of the first service is switched from the first ingress node to a second ingress node, the network controller controls the first ingress node to forward the combination configuration information to the second ingress node.

According to the method in this embodiment, when the SDN is a core network, and both the access networks on the two sides of the SDN are non-SDN networks, transmission efficiency of the SDN can be improved.

An embodiment of this application further discloses an SDN and an SDN-based data transmission method, which are intended to improve transmission efficiency of the SDN. It should be noted that, according to the SDN and the SDN-based data transmission method in this embodiment of this application, the SDN needs to perform pre-configuration to achieve the foregoing purpose. For a specific configuration method, refer to description of the foregoing embodiments, and details are not described herein.

The following clearly and completely describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

Figure 10:
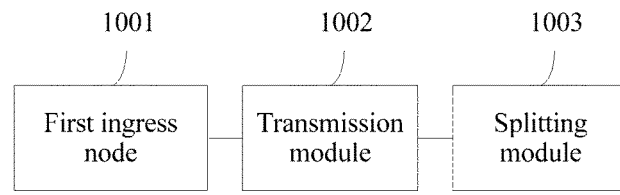
FIG. 10 is a schematic structural diagram of an SDN according to an embodiment of this application.

As shown in FIG. 10, an embodiment of this application discloses an SDN, including a first ingress node 1001, a transmission module 1002, and a splitting module 1003.

The first ingress node 1001 is configured to: when receiving a first type of data stream of a first service, combine received data packets of the first service according to preset configuration information, where the first ingress node is an ingress node of the first service in the software-defined network, and the first type of data stream is a data stream subsequent to a first data stream of the first service.

Optionally, a combined data packet includes a combination header, where the combination header is generated according to headers of the data packets of the first service, and the first ingress node is the ingress node of the first service in the software-defined network. When a received data stream of the first service is the first data stream of the first service, the first ingress node needs to first decompress a header-compressed data packet, so as to obtain a header of the data stream of the first service.

In this embodiment, for the combined data packet, refer to FIG. 3 and FIG. 4. To facilitate locating of each small data packet during data packet splitting, when data packets are being combined, a field of a fixed length may be used to separately indicate a quantity of data packets that are combined and a length of each data packet that is combined. The fixed value may be preset according to an actual situation.

In this embodiment, the data packets that are combined may be data packets that are of the first service and that arrive at the first ingress node at a same time or within a preset time. The first service may be but not limited to a delay-non-sensitive service.

The transmission module 1002 is configured to transmit the combined data packet.

The splitting module 1003 is configured to split the combined data packet into data packets before being combined, where when a destination node of a data packet of the first service belongs to the software-defined network, the splitting module is the destination node; or when a destination node of a data packet of the first service does not belong to the software-defined network, the splitting module is a distribution node of the first service in the software-defined network.

In this embodiment, an SDN network performs transmission after concatenating data packets, and splits a combined data packet on a destination node or a distribution node, that is, combines small data packets into a large data packet for transmission. Therefore, transmission efficiency can be improved.

Figure 11:
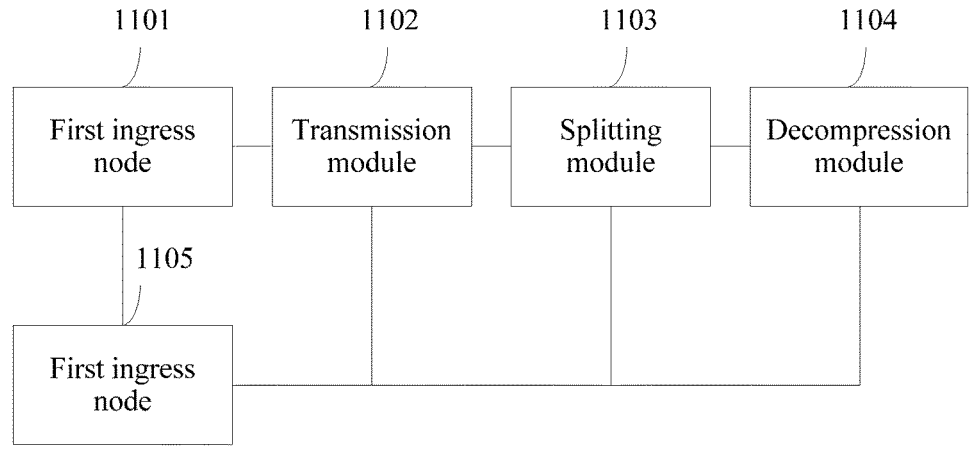
FIG. 11 is a schematic structural diagram of another SDN according to an embodiment of this application.

As shown in FIG. 11, an embodiment of this application discloses an SDN, including a first ingress node 1101, a transmission module 1102, a splitting module 1103, a decompression module 1104, and a second ingress node 1105.

The first ingress node 1101 is configured to: when receiving a first type of data stream of a first service, perform header compression on a data packet of the first service according to preset configuration information, and combine header-compressed data packets.

The transmission module 1102 is configured to transmit the combined data packet.

In this embodiment, the transmission module may be a router or a switch in the SDN. A controller in the software-defined network performs in advance flow entry configuration on the router or the switch in the software-defined network by using the combination header.

The splitting module 1103 is configured to split the combined data packet into data packets before being combined.

The decompression module 1104 is configured to decompress the split data packets.

When a destination node of the data packet of the first service belongs to the software-defined network, the decompression module is the destination node; or when a destination node of the data packet of the first service does not belong to the software-defined network, the decompression module is the distribution node.

When an ingress node of the first service is switched from the first ingress node to the second ingress node, the first ingress node sends the combination configuration information to the second ingress node.

The second ingress node 1105 is configured to: when the ingress node of the first service is switched from the first ingress node to the second ingress node, combine received data packets of the first service according to the combination configuration information.

In this embodiment, an SDN network has relatively high data packet transmission efficiency, and can maintain relatively high transmission efficiency after a service ingress node is switched.

Figure 12:
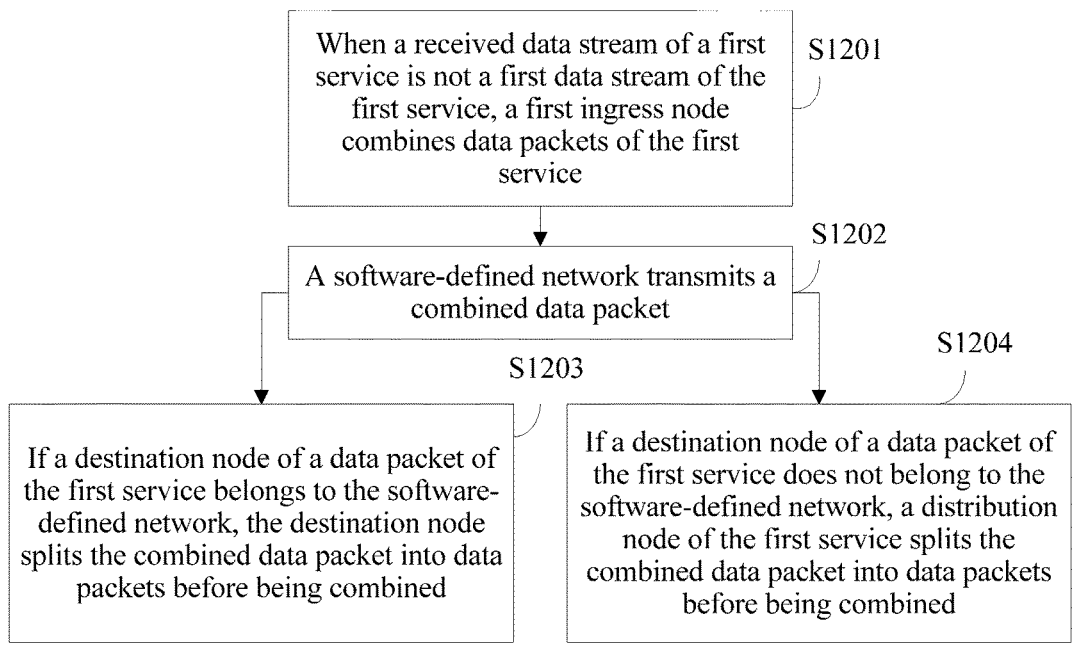
FIG. 12 is a flowchart of an SDN-based data transmission method according to an embodiment of this application.

As shown in FIG. 12, an embodiment of this application further discloses an SDN-based data transmission method, including the following steps.

S1201. When a received data stream of a first service is not a first data stream of the first service, a first ingress node in a software-defined network combines received data packets of the first service according to preset configuration information.

A combined data packet includes a combination header, where the combination header is generated according to headers of the data packets of the first service, and the first ingress node is an ingress node of the first service in the software-defined network.

In this embodiment, for the combined data packet, refer to FIG. 3 or FIG. 4. To facilitate locating of each small data packet during data packet splitting, when data packets are being combined, a field of a fixed length may be used to separately indicate a quantity of data packets that are combined and a length of each data packet that is combined. The fixed value may be preset according to an actual situation.

In this embodiment, the data packets that are combined may be data packets that are of the first service and that arrive at the first ingress node at a same time or within a preset time. The first service may be but not limited to a delay-non-sensitive service.

S1202. The software-defined network transmits a combined data packet.

S1203. If a destination node of a data packet of the first service belongs to the software-defined network, the destination node splits the combined data packet into data packets before being combined.

S1204. If a destination node of a data packet of the first service does not belong to the software-defined network, a distribution node of the first service in the software-defined network splits the combined data packet into data packets before being combined.

In this embodiment, an SDN network performs transmission after concatenating data packets, and splits a combined data packet on a destination node or a distribution node, that is, combines small data packets into a large data packet for transmission. Therefore, transmission efficiency can be improved.

Figure 13:
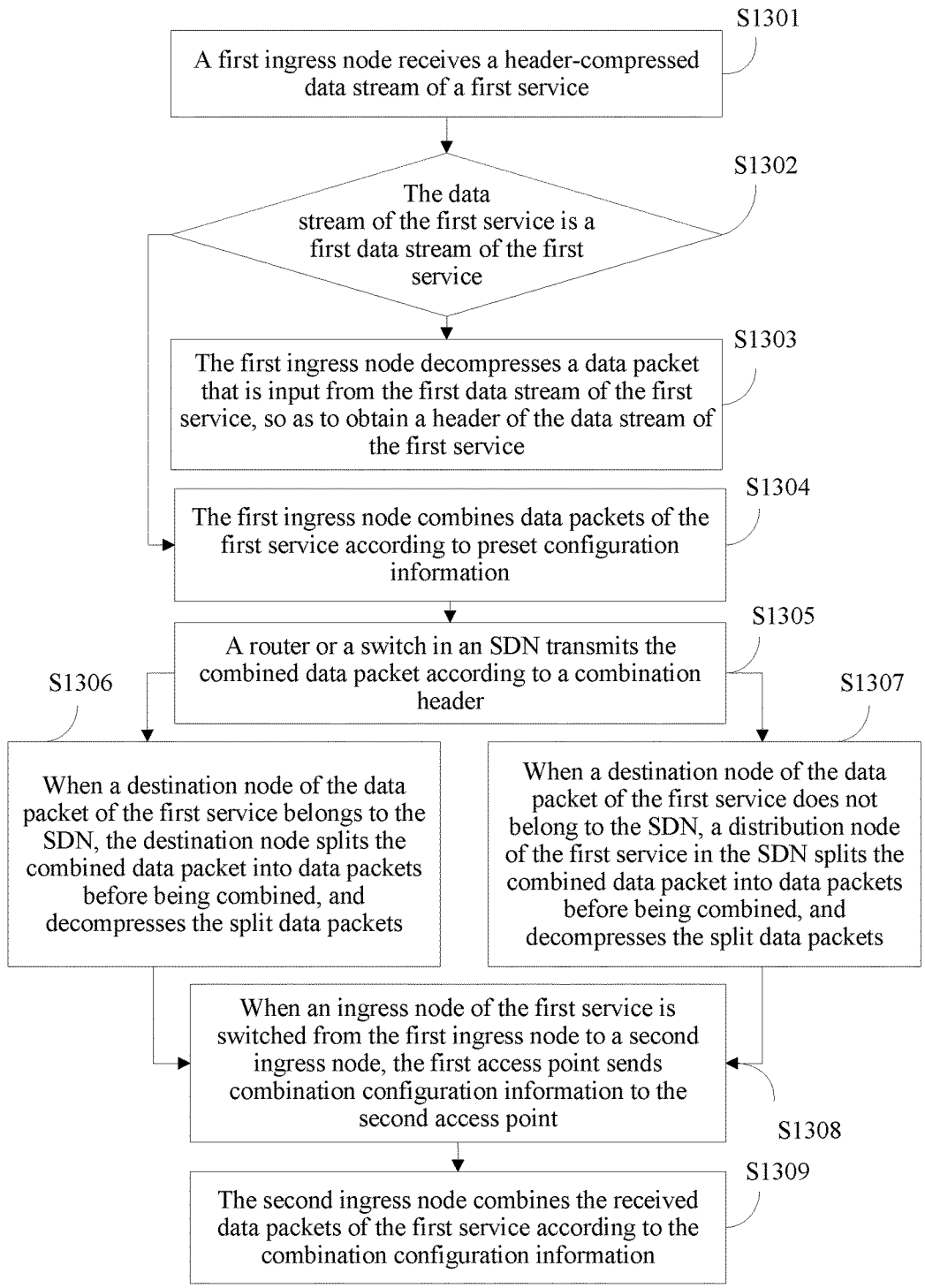
FIG. 13 is a flowchart of another SDN-based data transmission method according to an embodiment of this application.

As shown in FIG. 13, an embodiment of this application discloses another SDN-based data transmission method, including the following steps.

S1301. A first ingress node receives a header-compressed data stream of a first service.

S1302. The first ingress node determines whether the received data stream of the first service is a first data stream of the first service, and if the received data stream of the first service is the first data stream of the first service, performs S1303; or if the received data stream of the first service is not the first data stream of the first service, performs S1304.

S1303. The first ingress node decompresses a data packet that is input from the first data stream of the first service, so as to obtain a header of the data stream of the first service.

S1304. The first ingress node combines data packets of the first service according to preset configuration information.

The combined data packet includes a combination header, where the combination header is generated according to headers of the data packets of the first service. The combined data packet may further include a quantity of data packets that are combined and lengths of the data packets that are combined. All the data packets that are combined carry a compressed data packet header.

Specifically, for the combined data packet, refer to FIG. 3 or FIG. 4.

S1305. A router or a switch in an SDN transmits a combined data packet according to a combination header.

S1306. When a destination node of the data packet of the first service belongs to the SDN, the destination node splits the combined data packet into data packets before being combined, and decompresses the split data packets.

S1307. When a destination node of the data packet of the first service does not belong to the SDN, a distribution node of the first service in the SDN splits the combined data packet into data packets before being combined, and decompresses the split data packets.

S1308. When an ingress node of the first service is switched from the first ingress node to a second ingress node, the first access point sends the combination configuration information to the second access point.

S1309. The second ingress node combines the received data packets of the first service according to the combination configuration information, where the second ingress node is an ingress node in the SDN network.

Specifically, if the second ingress node has another one or more data streams of the first service, and these data streams have a same destination node or SDN distribution node, data packet combination is performed on a data stream switched from the first ingress node and a data stream of the first service on the second ingress node.

According to the method in this embodiment, a header-compressed data packet can be transmitted in an SDN, thereby improving transmission efficiency of the SDN.

Figure 14:
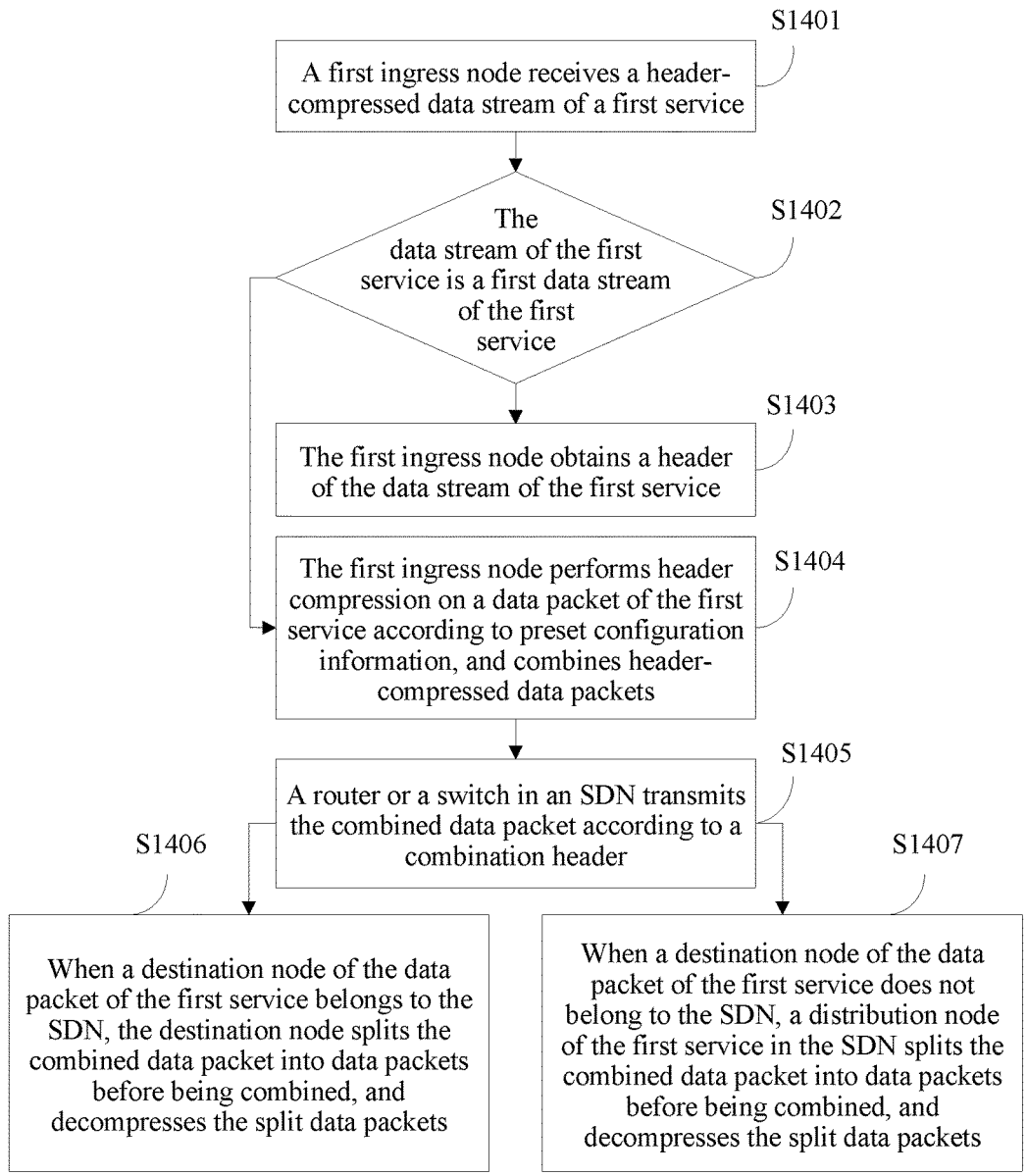
FIG. 14 is a flowchart of still another SDN-based data transmission method according to an embodiment of this application.

As shown in FIG. 14, an embodiment of this application discloses another SDN-based data transmission method, including the following steps.

S1401. A first ingress node receives a data stream of a first service.

S1402. The first ingress node determines whether the received data stream of the first service is a first data stream of the first service, and if yes, performs S1403; or if no, performs S1404.

S1403. The first ingress node obtains a header of the data stream of the first service.

S1404. The first ingress node performs header compression on a data packet of the first service according to preset configuration information, and combines header-compressed data packets.

The combined data packet includes a combination header, where the combination header is generated according to headers of the data packets of the first service. The combined data packet may further include a quantity of data packets that are combined and lengths of the data packets that are combined. All the data packets that are combined carry a compressed data packet header.

Specifically, for the combined data packet, refer to FIG. 3 or FIG. 4.

S1405. A router or a switch in an SDN transmits a combined data packet according to a combination header.

S1406. When a destination node of the data packet of the first service belongs to the SDN, the destination node splits the combined data packet into data packets before being combined, and decompresses the split data packets.

S1407. When a destination node of the data packet of the first service does not belong to the SDN, a distribution node of the first service in the SDN splits the combined data packet into data packets before being combined, and decompresses the split data packets.

Likewise, when an ingress node of the first service is switched, a header compression function and a combination function for the data packet of the first service may be switched to a new ingress node of the first service, as described in the foregoing embodiment. Details are not described herein.

According to the method in this embodiment, in addition to concatenating data packets, a first ingress node may compress data packets of a first service. Therefore, data packet transmission efficiency of an SDN can be further improved.

If the functions of the method in the embodiment are implemented in the form of a software functional unit and sold or used as an independent product, the functions may be stored in a computing device-readable storage medium. Based on such an understanding, the part of the embodiments of the present invention contributing to the prior art or some of the technical solutions may be implemented in a form of a software product. The software product is stored in a storage medium, and includes several instructions for instructing a computing device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable persons skilled in the art to implement or use the present invention. Various modifications to the embodiments are obvious to the persons skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features disclosed in this specification.

What is claimed is:

1. A network controller, comprising:
 a first transmitter, configured to: when receiving a first type of data stream of a first service, send combination configuration information to a first ingress node, wherein the combination configuration information is used to instruct the first ingress node to combine received data packets of the first service, and the first type of data stream is a data stream subsequent to a first data stream of the first service;
 a second transmitter, configured to instruct a software-defined networking (SDN) controller to perform flow entry configuration on a router or a switch, or a router and a switch in a software-defined network by using the configuration information; and
 a third transmitter, configured to: when a destination node of a data packet of the first service belongs to the software-defined network, send data packet splitting configuration information to the destination node; or when a destination node of a data packet of the first service does not belong to the software-defined network, send data packet splitting configuration information to a distribution node of the first service in the software-defined network, wherein the data packet splitting configuration information is used to instruct the destination node or the distribution node to split a combined data packet into data packets before being combined, wherein the first transmitter is configured to send the combination configuration information to the first ingress node, wherein the combination configuration information comprises a combination header, and the combination header is generated according to headers of the data packets of the first service.

2. The network controller according to claim 1, wherein the first transmitter is configured to send the combination configuration information to the first ingress node, wherein the combination configuration information comprises the combination header, and when received data streams of the first service have a same destination node, the combination header is a header of a data packet that is input from the first data stream of the first service.

3. The network controller according to claim 1, wherein the first transmitter is configured to send the combination configuration information to the first ingress node, wherein the combination configuration information comprises the combination header, and when received data streams of the first service have different destination nodes but a same distribution node, the combination header is a virtual header, and the virtual header comprises an address of the distribution node.

4. The network controller according to claim 1, further comprising:
a fourth transmitter, configured to: when the data packet of the first service is a header-compressed data packet, when the destination node of the data packet that is in the first type of data stream and that is of the first service belongs to the software-defined network, send decompression configuration information to the destination node; or when the destination node of the data packet of the first service does not belong to the software-defined network, send decompression configuration information to the distribution node, wherein the decompression configuration information is used to instruct the destination node or the distribution node to decompress the split data packets.

5. The network controller according to claim 1, further comprising:
a fifth transmitter, configured to: when receiving the first type of data stream of the first service, send header compression configuration information to the first ingress node, wherein the header compression configuration information is used to instruct the first ingress node to perform header compression on the received data packets of the first service.

6. The network controller according to claim 1, wherein when an ingress node of the data packet of the first service belongs to an access network of the software-defined network, and the destination node of the data packet of the first service belongs to a non-software-defined network, the distribution node of the first service is an access network gateway that is in the software-defined network and that connects the software-defined network and the non-software-defined network.

7. The network controller according to claim 1, wherein when an ingress node of the data packet of the first service belongs to a non-software-defined network, and the destination node of the data packet of the first service belongs to an access network of the software-defined network, an ingress node of the first service is an access network gateway that is in the software-defined network and that connects the non-software-defined network and the software-defined network.

8. The network controller according to claim 1, wherein the first transmitter is further configured to:
when the ingress node of the first service is switched from the first ingress node to a second ingress node, send the combination configuration information to the second ingress node, wherein the second ingress node is an ingress node in the SDN network.

9. The network controller according to claim 1, wherein when the software-defined network is a core network, and both access networks on two sides of the software-defined network are non-software-defined networks, the first ingress node is a first edge gateway, wherein the first edge gateway is an edge gateway that is in the software-defined network and that connects the software-defined network and a first non-software-defined network, the distribution node of the first service in the software-defined network is a second edge gateway, the second edge gateway is an edge gateway that is in the software-defined network and that connects the software-defined network and a second non-software-defined network, the first non-software-defined network is a network in which a source node of the data stream of the first service is located, and the second non-software-defined network is a network in which the destination node of the data stream of the first service is located.

10. The network controller according to claim 9, further comprising:
a controller, configured to: when an ingress node of the first service is switched from the first ingress node to a second ingress node, control the first ingress node to forward the combination configuration information to the second ingress node.

11. A method of software-defined network configuration, comprising:
when receiving a first type of data stream of a first service, sending, by a network controller, combination configuration information to a first ingress node, wherein the combination configuration information is used to instruct the first ingress node to combine received data packets of the first service, and the first type of data stream is a data stream subsequent to a first data stream of the first service;

instructing, by the network controller, a software-defined networking SDN controller to perform flow entry configuration on a router or a switch, or a router and a switch in the software-defined network by using the configuration information; and when a destination node of a data packet of the first service belongs to the software-defined network, sending, by the network controller, data packet splitting configuration information to the destination node; or when a destination node of a data packet of the first service does not belong to the software-defined network, sending, by the network controller, data packet splitting configuration information to a distribution node of the first service in the software-defined network, wherein the data packet splitting configuration information is used to instruct the destination node or the distribution node to split a combined data packet into data packets before being combined, wherein the combined data packet comprises a combination header, a quantity of data packets that are combined, and lengths of the data packets that are combined, and the combination header is generated according to headers of the data packets of the first service.

12. A method of software-defined network based data transmission, comprising:

when receiving a first type of data stream of a first service, concatenating, by a first ingress node in the software-defined network, received data packets of the first service according to preset configuration information, wherein the first ingress node is an ingress node of the first service in the software-defined network, and the first type of data stream is a data stream subsequent to a first data stream of the first service;

transmitting, by the software-defined network, a combined data packet; and when a destination node of a data packet of the first service belongs to the software-defined network, splitting, by the destination node, the combined data packet into data packets before being combined; or when a destination node of a data packet of the first service does not belong to the software-defined network, splitting, by a distribution node of the first service in the software-defined network, the combined data packet into data packets before being combined, wherein the combined data packet comprises a combination header, a quantity of data packets that are combined, and lengths of the data packets that are combined, and the combination header is generated according to headers of the data packets of the first service.

13. The method according to claim 12, wherein when received data streams of the first service have a same destination node, the combination header is a header of the first data stream of the first service.

14. The method according to claim 12, wherein when received data streams of the first service have different destination nodes but a same distribution node in the software-defined network, the combination header is a virtual header, and the virtual header is an address of the distribution node of the first service in the software-defined network.

15. The method according to claim 12, wherein the transmitting, by the software-defined network, a combined data packet comprises:

transmitting, by a router or a switch in the software-defined network, the combined data packet, wherein a controller in the software-defined network performs in advance flow entry configuration on the router or the switch in the software-defined network by using the combination header.

16. The method according to claim 12, wherein the data packet of the first service is a header-compressed data packet, and the method further comprises:

when the destination node of the data packet of the first service belongs to the software-defined network, decompressing, by the destination node, the split data packets; or when the destination node of the data packet of the first service does not belong to the software-defined network, decompressing, by the distribution node, the split data packets.

17. The method according to claim 12, further comprising:

when a received data stream of the first service is the first data stream of the first service, decompressing, by the first ingress node, a header-compressed data packet, so as to obtain a header of the data stream of the first service.

18. The method according to claim 16, further comprising:

when a received data stream of the first service is not the first data stream of the first service, performing, by the first ingress node, header compression on the data packet of the first service according to the preset configuration information.

* * * * *